Dec. 26, 1944.  J. W. HOWLETT  2,365,760
MACHINE FOR CUTTING METAL TUBULAR MEMBERS INTO RINGS
Filed Oct. 7, 1943

INVENTOR:
JOHN W. HOWLETT
by Mawhinney & Mawhinney
ATTY'S

Patented Dec. 26, 1944

2,365,760

UNITED STATES PATENT OFFICE 2,365,760

MACHINE FOR CUTTING A METAL TUBULAR MEMBER INTO RINGS

John William Howlett, London, England, assignor of one-half to Wellworthy Piston Rings Limited, London, England Application October 7, 1943, Serial No. 505,367
In Great Britain December 22, 1942

4 Claims. (Cl. 29—70)

This invention relates to a machine, for cutting a metal pot, cylinder or other tubular member into piston-rings, washers or other rings, of the kind including a rotatable spindle carrying a number of axially-spaced circular saws or other cutters and, parallel thereto, a second rotatable spindle supported by a slide which can be operated for feeding purposes, the second spindle supporting the tubular member.

In order to ensure accuracy it is desirable that the free end of the second spindle should be journalled, and to facilitate loading and unloading it is also desirable that the journal support should be able to be quickly moved out of the way, and subsequently returned.

My main object is to provide for this in a very simple manner.

Figure 1:
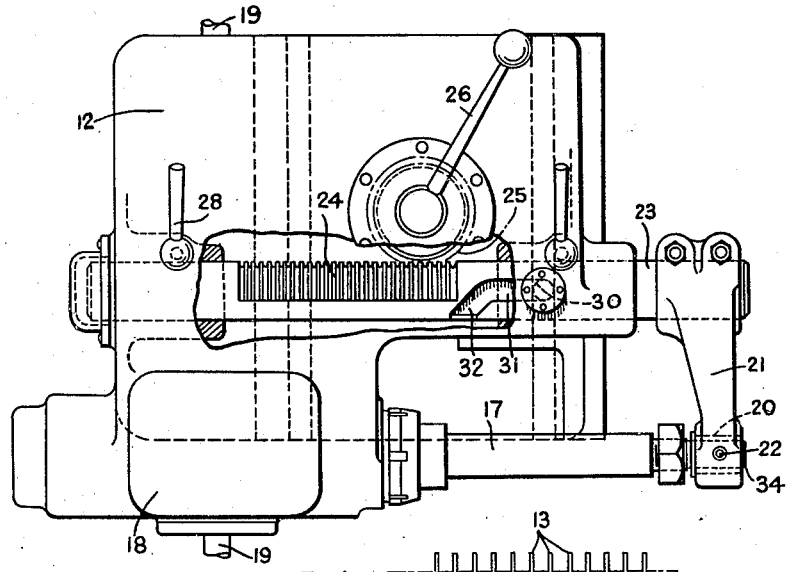
Figure 2:
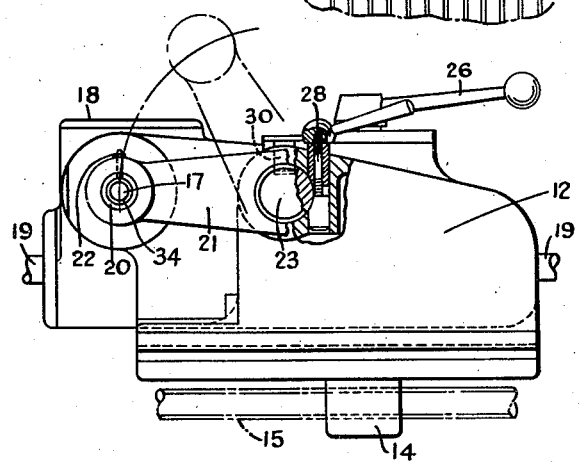

This and other objects and advantages of the invention will be better understood if attention be paid to the following description in which reference is made to the accompanying drawing, wherein:

Figure 1 is a plan mainly of the slide with part of the casing thereof broken away; and Figure 2 is a part-sectional end elevation thereof taken from the right of Figure 1.

Referring now to the drawing, this indicates the slide 12 which is movable towards or away from the axially-spaced circular cutters 13. The latter are indicated by chain lines, and their supporting shaft and headstock are omitted for the sake of simplicity. For feeding purposes the slide is fast with a nut 14 (Figure 2) extending through a cored slot in the base to be engaged by an endwise-fast lead screw 15 in the base.

At 17 is shown the spindle upon which the tubular member is to be supported in any convenient manner. The spindle is fast with and driven by a worm wheel engaged with a worm within the casing 18, the worm being slidingly and drivingly engaged with an endwise-fast shaft 19 driven from an electric motor or in other ways—for example, as disclosed in the specification of my co-pending patent application Serial No. 505,366 filed on the 7th of October, 1943.

The free end of the spindle 17 is journalled in a phosphor-bronze bush 20 carried by an arm 21 which is fitted at 22 with an oil nipple. The arm is fast on a shaft 23 mounted in the slide to be parallel to the spindle 17, and the arm is formed with part-circular rack teeth 24 engaged with a pinion 25 which is fast with an operating handle 26 disposed upon the top of the slide. The body of the latter, where the shaft 23 is supported, is provided with two similar clamping devices, of a kind known per se, indicated at 28.

When a tubular member on the spindle 17 has been cut through into a number of rings and the slide has been withdrawn to carry the tubular member away from the cutters, the latter should be brought to rest to avoid the possibility of injury to the operator, and for this purpose a limit switch or the equivalent controlled by the outward movement of the slide may be arranged to effect disconnection of the driving means for the cutters. Thereupon the operator turns the clamping devices 28 in the releasing direction and then by means of the handle 26 turns the pinion and slides the shaft axially to carry the bearing bush 20 clear of the end of the spindle. During this movement a stationary roller 30 runs along the longitudinal portion of a cam slot 31 in the shaft, entering the inclined portion 32 thereof when the bearing is clear of the end of the spindle, so that further rotation of the pinion will swing the arm upwardly, say, through 60°, to the position shown by the chain lines in Figure 2.

After the rings have been removed and a fresh tubular member mounted on the spindle 17, the above operations are reversed, the end of the spindle being bevelled as shown at 34 to give a lead when the bearing 20 is being entered thereon.

What I claim as my invention and desire to secure by Letters Patent of the United States is:

1. A machine for cutting a metal tubular member into rings, including a rotatable spindle, a number of axially-spaced cutters to be carried by said spindle, a second rotatable spindle parallel to the first spindle, said second spindle being supported by a slide which can be operated for feeding purposes, said second spindle supporting the tubular member and being journalled at its free end in a bearing, and an arm carrying said bearing, guiding means for the arm so that it can be moved parallel to the spindles to disengage said bearing from said second spindle and then turned into an out-of-the-way position, for loading and unloading purposes.

2. A machine for cutting a metal tubular member into rings, including a rotatable spindle, axially-spaced circular cutters fast on said spindle, a rotatable spindle for supporting the tubular member parallel to the first spindle, the second spindle being supported upon a slide operable for feeding purposes, a bearing journalling one end of said second spindle, an arm carrying said bearing, an axially-movable and rotatable shaft carrying said arm, and means for moving said shaft axially, said shaft having a cam groove engaged with a stationary projection such that, on axial movement of said shaft, said arm will be turned to carry said bearing clear of the end of said second spindle and then into an out-of-the-way position.

3. A machine for cutting a metal tubular member into rings, including a rotatable spindle, axially-spaced circular cutters fast on said spindle, a rotatable spindle for supporting the tubular member parallel to the first spindle, the second spindle being supported upon a slide operable for feeding purposes, a bearing journalling one end of said second spindle, an arm carrying said bearing, an axially-movable and rotatable shaft carrying said arm, and rack-and-pinion mechanism for moving said shaft axially, said shaft having a cam groove engaged with a stationary projection such that, on axial movement of said shaft, said arm will be turned to carry said bearing clear of the end of said second spindle and then into an out-of-the-way position.

4. A machine tool including a support, a rotatable spindle journalled in and extending from the support, a bearing journalling the extending end of said spindle, an arm carrying said bearing, an axially movable and rotatable shaft carrying said arm, said shaft being mounted in the support parallel to said spindle, leverage means for moving said shaft axially, and means for clamping said shaft in the support, said shaft having a cam groove engaged with a roller carried by the support such that, on axial movement of said shaft in one direction, said arm will be turned to carry said bearing clear of the end of said spindle and then into an out-of-the-way position.

JOHN WILLIAM HOWLETT.